Nov. 18, 1952      L. VANDERHOOFVEN      2,618,305
PEACH PITTING DEVICE

Filed Feb. 20, 1950      4 Sheets—Sheet 1

Leonard Vanderhoofen
INVENTOR.

Nov. 18, 1952 L. VANDERHOOFVEN 2,618,305
PEACH PITTING DEVICE
Filed Feb. 20, 1950 4 Sheets-Sheet 2

Leonard Vanderhoofven
INVENTOR.

BY
Attorneys

Nov. 18, 1952  L. VANDERHOOFVEN  2,618,305
PEACH PITTING DEVICE

Filed Feb. 20, 1950  4 Sheets-Sheet 3

Leonard Vanderhoofven
INVENTOR.

BY Clarence A. O'Brien
and Harvey B. Jacobson
Attorneys

Nov. 18, 1952     L. VANDERHOOFVEN     2,618,305
PEACH PITTING DEVICE
Filed Feb. 20, 1950                                  4 Sheets-Sheet 4
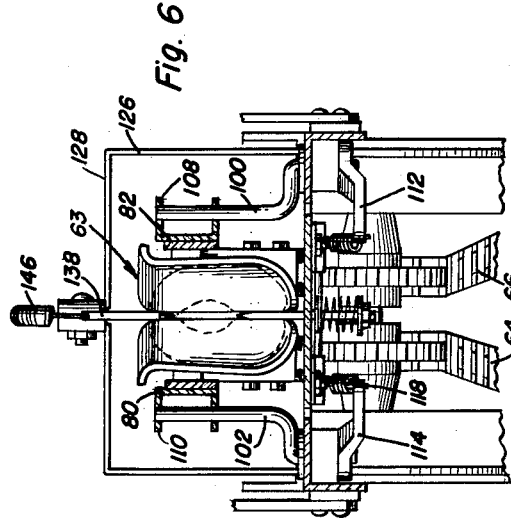
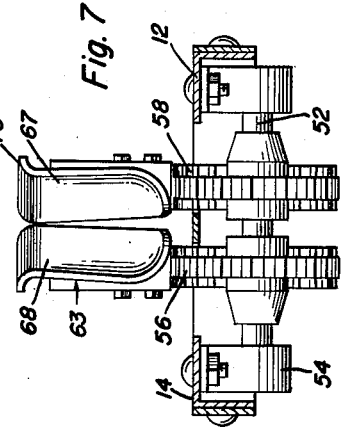
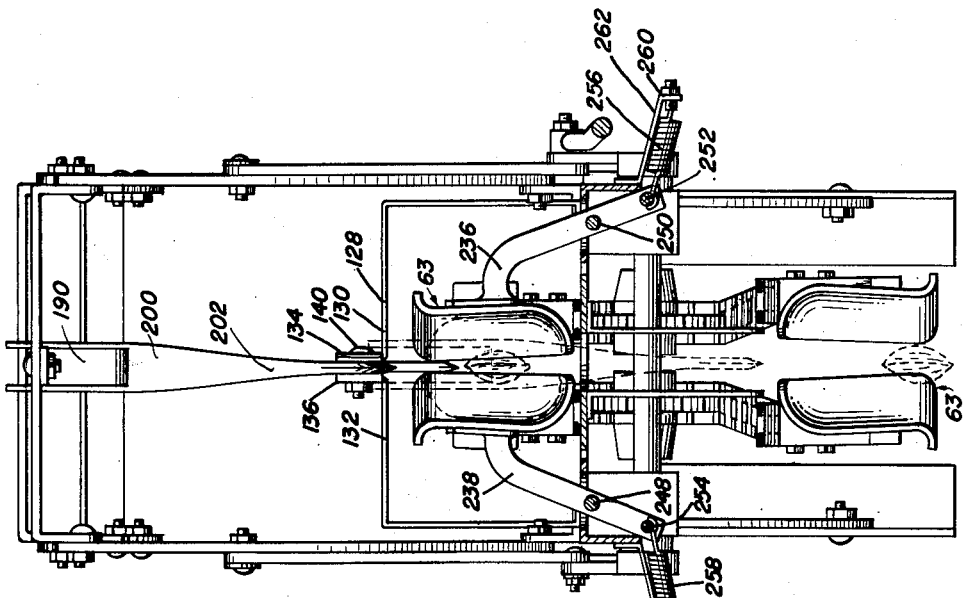
Leonard Vanderhoofven
INVENTOR.

Patented Nov. 18, 1952

2,618,305

UNITED STATES PATENT OFFICE 2,618,305

PEACH PITTING DEVICE

Leonard Vanderhoofven, Delta, Colo.

Application February 20, 1950, Serial No. 145,103

1 Claim. (Cl. 146—28)

This invention appertains to a device for cutting peaches and similar fruits into halves and extracting the seeds or pits therefrom.

A primary object of the instant invention is to cleanly and smoothly cut a peach or similar fruit having seeds therein in half and remove the stone or pit therefrom, without tearing parts of the fruit and without shredding any of the fruit adjacent to the pit.

Another important object of this invention is to facilitate the removal of pits from peaches by initially forming two vertically aligned incisions in the peaches and then, by means of vertically reciprocable cutter, halving the peaches and forcing the pits downwardly from the halves.

Another important object of this invention is to reduce the labor and operating space attendant with the halving and pitting of peaches or similar fruit and to increase production.

These and ancillary objects and structural features of merit are attained by this invention, the preferred embodiment of which is set forth in the following description and illustrated in the accompanying drawings, wherein:

Figure 5 is a transverse sectional view taken on the line 5—5 of Figure 4;

Figure 6 is a transverse sectional view taken on the line 6—6 of Figure 4;

Figure 7 is an enlarged front elevational view of one of the fruit carriers; and Figure 8 is a detail sectional view taken on the line 8—8 of Figure 1.

Figure 1:
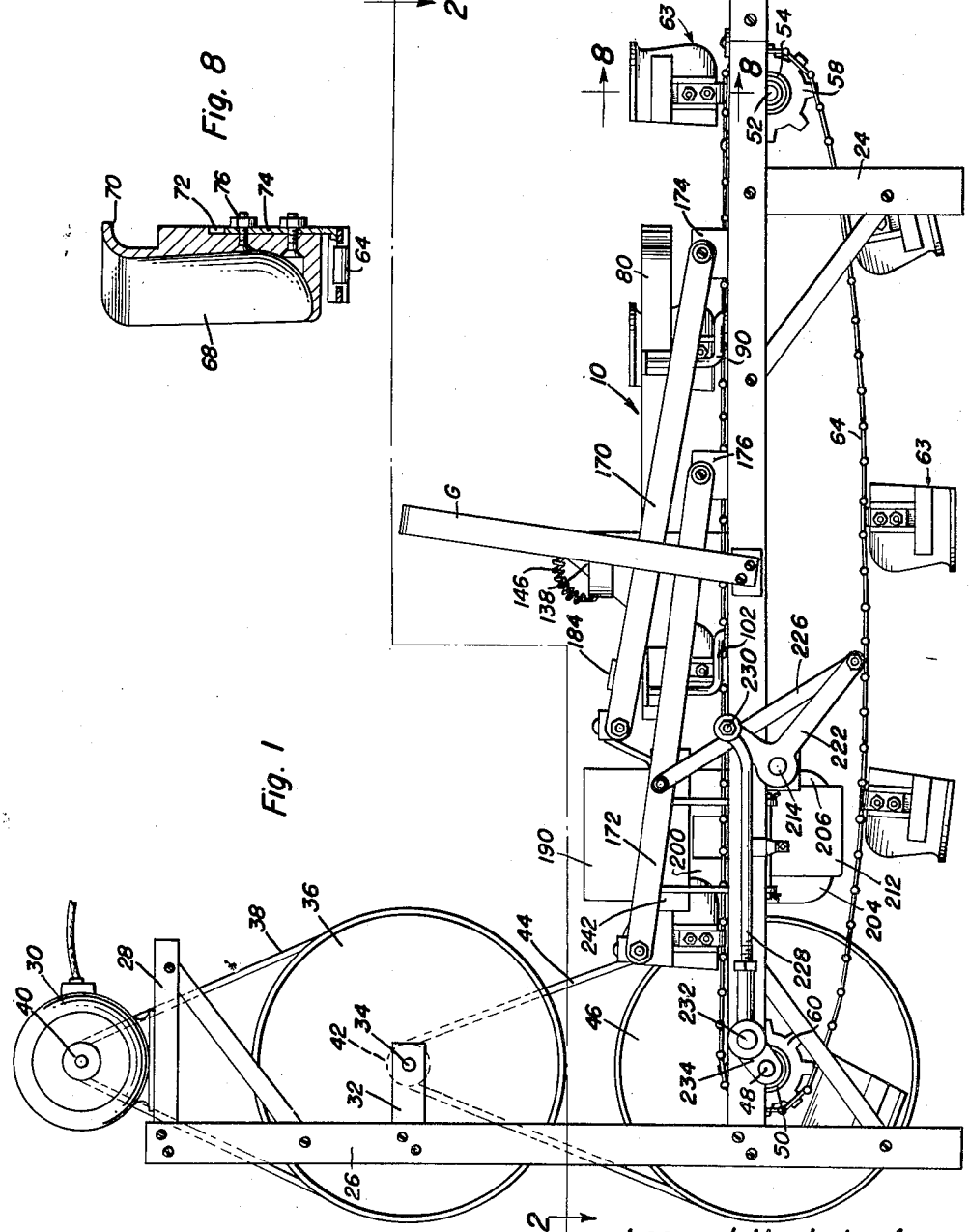
Figure 1 is an enlarged side elevational view of the machine, constructed in accordance with the principles of this invention.

This invention relates to a machine for halving and pitting peaches, which are used for fancy canning. Peaches of this type must be cut cleanly and smoothly, without any tearing of the fruit.

The machine is entirely automatic and the fruit is carried by fruit carriers mounted on rotary chains through a pair of vertically aligned fixed knives, which form vertically aligned incisions in the upper and lower portions of the fruit. A vertically reciprocable cutter and pitter is then forced downwardly on to the fruit and the fruit is halved, with the pit or stone ejected and forced downwardly from the halves.

The machine, generally designated by the numeral 10, includes a pair of longitudinally extending parallel side bars 12 and 14, which are connected at their opposing ends by cross bars 16 and 18 and a center bar 20. Standards or supporting legs 24 are bolted at their upper terminals to the cross bar 16 and standards 26 are bolted adjacent their lower ends to the opposite ends of the side bars adjacent to the cross bar 18. The standards 26 project upwardly beyond the side bars and serve as a support for a horizontally disposed platform 28, on which a motor 30 is mounted. An arm 32 extends outwardly from one of the standards 26 and a shaft 34 is rotatably journaled thereon, the shaft supporting a large pulley wheel 36, which is connected by a belt 38 to a pulley 40 on the armature shaft of the motor. A smaller pulley 42 is fixed on the shaft 34 and is connected by a belt 44 to a large pulley wheel 46. The pulley wheel 46 is fixed on the extending end of a drive shaft 48, the shaft 48 being rotatably journaled in bearings 50 bolted to the underside of the side bars 12 and 14, adjacent to the standards 26.

Figure 2:
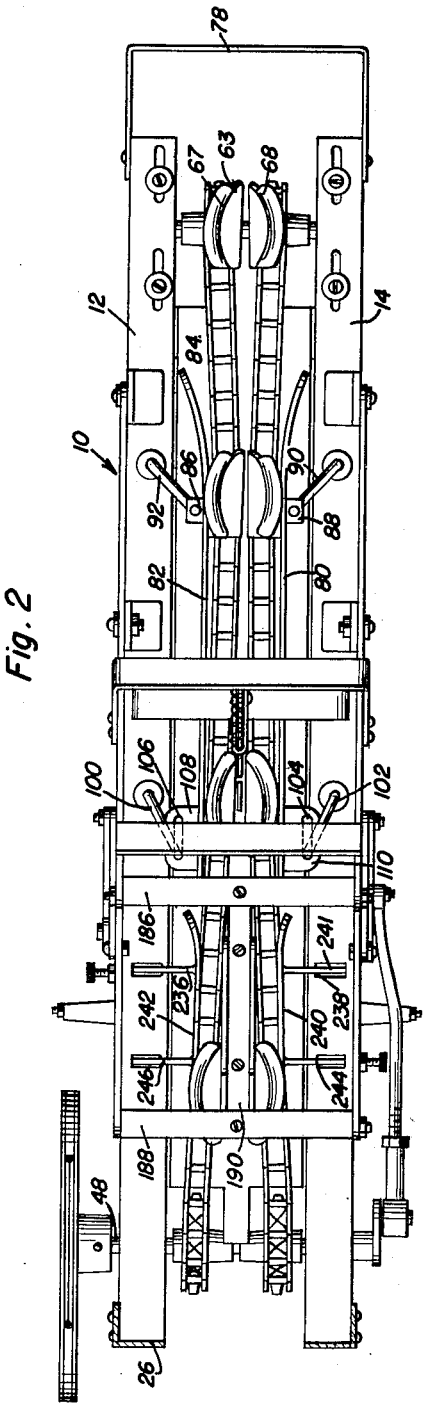
Figure 2 is a top plan view, taken on line 2—2 of Figure 1.

A shaft 52 is transversely journaled at the opposite ends of the side bars 12 and 14 and is mounted in bearings 54. Sprockets 56 and 58 are disposed on the shaft 52 and complementary sprockets 60 and 62 are mounted on the shaft 48. An endless chain 64 connects the sprockets 58 and 60 and a parallel endless chain 66 connects the sprockets 56 and 62. The chains are rotated by means of the motor 30 through the belt transmission means connected to the shaft 48 and fruit carriers 63 are fixed on the chains, at longitudinally spaced points thereon. The fruit carriers 63 include cooperating cup sections 67 and 68. The sections 67 and 68 are concavo-convex and are formed with upwardly and outwardly flared lips 70. The outer surface of the sections are enlarged and formed with a vertical groove 72 to receive a strap 74 bolted thereto by a bolt 76. The strap 74 is connected to the link of the chains 64 and 66 to secure the sections thereto. The sections 67 and 68 cooperate to form the sectional cups or fruit carriers 63. Thus, as the chains are rotated, the carriers are moved in an upstanding position along the upper reaches of the chains, as seen in Figure 2. The fruit is deposited in the carriers, at the end of the frame adjacent to the shaft 52 and may be either manually or automatically disposed in the carriers. A U-shaped safety bar 78 is pivotally mounted to the ends of the side bars to protect an operator, if the carriers are manually loaded.

A pair of elongated bumper bars 80 and 82 extend on the upper reaches of the chains and overlie an elongated plate 84 which is secured between the side bars. The bumpers are urged inwardly relative to the chains by resilient means and hold the chains in parallel spaced relationship for the purpose of moving the sections of the carriers closer together, so that the fruit therein is accurately moved through a pair of vertically spaced and aligned fixed cutters. The bars 80 and 82 are formed with laterally extending apertured ears 86 and 88 through which one terminal of a pair of cranks 90 and 92 is pivoted. The cranks 90 and 92 are rotatably journaled in the side bars 12 and 14 and arms 94 and 96 are clamped on the depending ends thereof, the arms extending inwardly from the side bars and being connected by a spring 98. Thus, the upper ends of the cranks are normally urged inwardly relative to each other by the spring 98 to force the ends of the bars 80 and 82 relative to each other and urge the chains inwardly. A similar pair of crank arms 100 and 102 are rotatably journaled in the side bars 12 and 14 and longitudinally spaced from the cranks 90, 92. The upper ends of the crank arms 100 and 102 are disposed in elongated slots 104 and 106 in lateral ears 108 and 110 on the front ends of the bars 80 and 82. Arms 112 and 114 are clamped on the lower terminals of the cranks 100 and 102. Springs 116 and 118 are anchored at one end to the arms and at their opposing ends to the opposing ends of the transverse section 120 of a T-shaped anchoring member 122, which supports a resiliently mounted fixed cutter. In this manner, the opposite ends of the bars 80 and 82 are urged inwardly.

Figure 4:
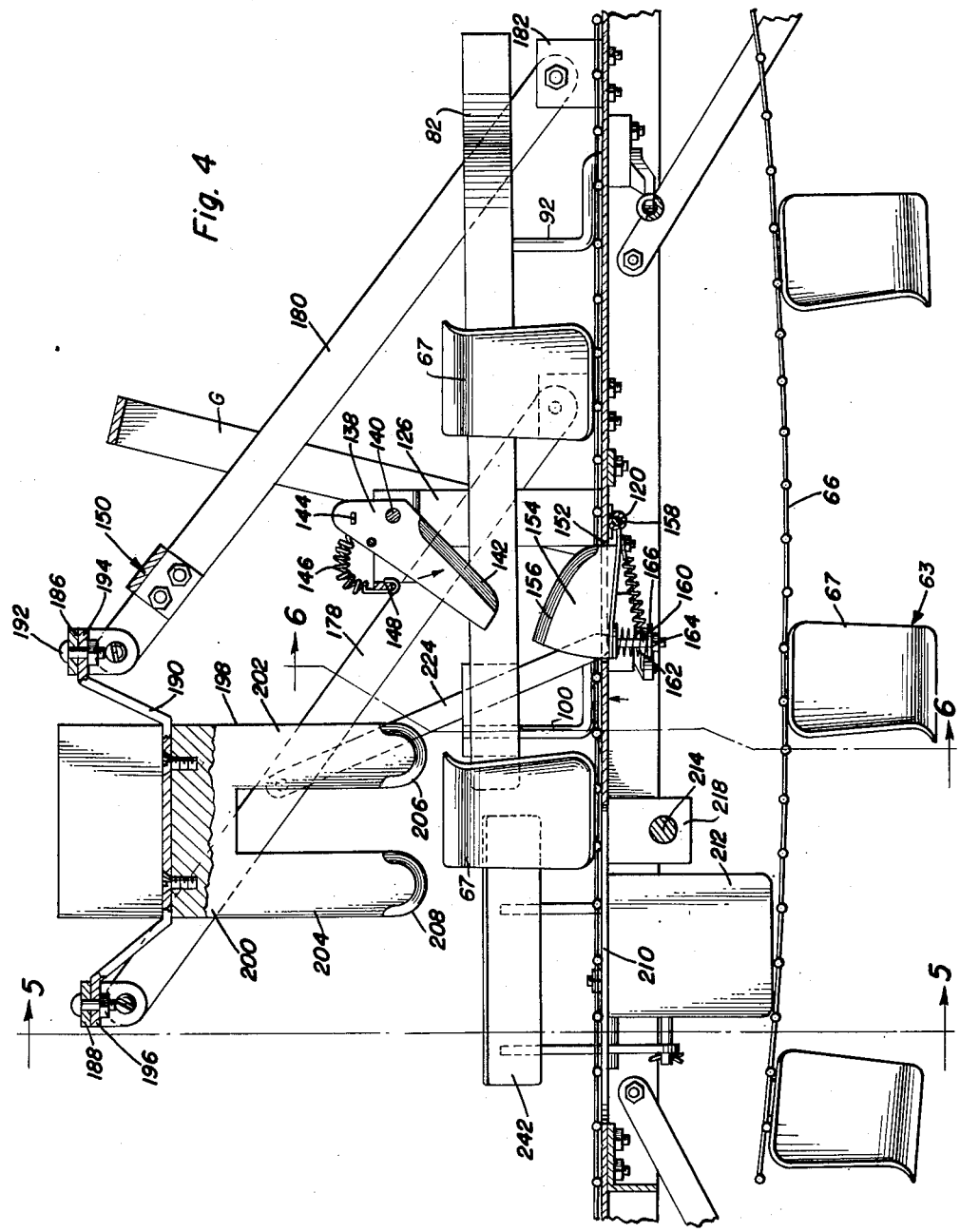
Figure 4 is an enlarged longitudinal sectional view, with portions shown in elevation.

As seen in Figures 4 and 5, a U-shaped bracket 126 is mounted on the side bars 12 and 14 and extends vertically therefrom. The U-shaped bracket 126 is provided with a web portion 128, which transversely overlies the plate 84 and is severed at its center to form sections 130 and 132 which terminate at their inner ends in upstanding apertured flanges 134 and 136. A knife 138 is mounted on a pivot pin 140, which extends through the flanges 134 and 136. The knife is formed with sharpened side edge 142 and an opening 144 is formed in the upper portion thereof above the pivot 140. The opening 144 is provided to receive one end of a spring 146, the opposing end of the spring being secured to a cross bar 148 and extends rearwardly of the pivot 140 and is carried by the bracket 128. In this manner, the lower end of the knife is urged downwardly, with the cutting edge 142 held in a downwardly inclined plane.

Figure 3:
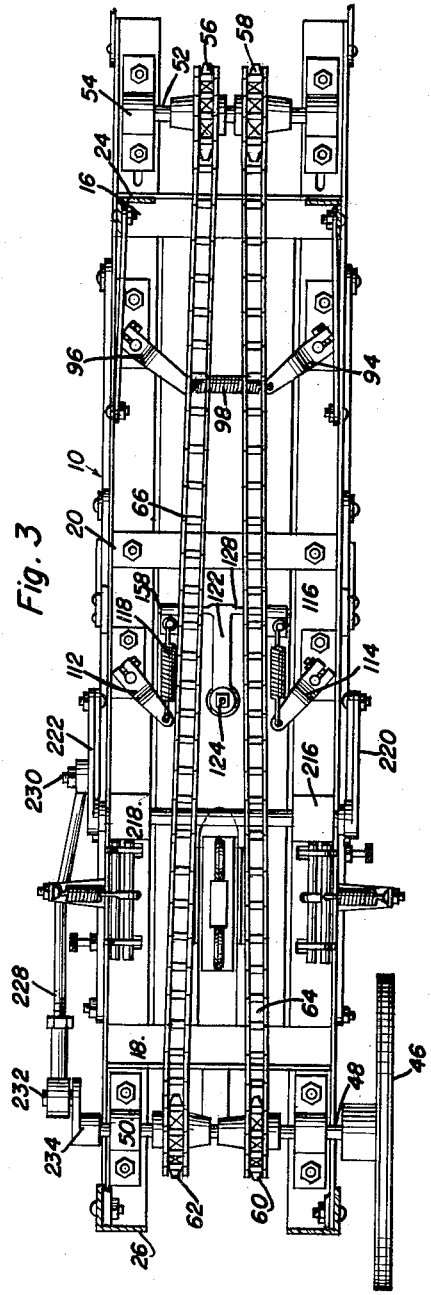
Figure 3 is a bottom view, with the fruit carriers or sectional cups removed from the rotary chains or conveyors.

A cutter 154 is disposed vertically in an opening 152 formed in the plate and is provided with an upper sharpened edge 156. The cutter is secured to the upper surface of the longitudinal section 122 of the T-shaped member, shown in Figure 3, and extends vertically therefrom. The transverse section 120 of the T-shaped member is formed as a sleeve and is journaled on a transverse shaft 158, the shaft being disposed between the side bars 12 and 14. A pin 160 extends downwardly from the outer end of the section 122 and a spring 162 is concentrically disposed above the pin, the lower end of the pin being exteriorly threaded to receive an adjusting nut 164, the nut abutting against a washer 166 which seats the lower end of the spring. The spring functions to hold the cutter or knife 154 in an upstanding position, it being noted that the cutting edges 142 and 156 are disposed in intersecting planes and a considerable portion of the cutting surface 142 and the cutting surface 156 are vertically aligned. The knives or cutters are positioned in the center of the base or platform 84 and are disposed between the two chains, so that the sections of each carrier pass on the opposing sides of each of the knives and the fruit in each carrier is formed with an incision in its upper and lower portions.

Means is disposed rearwardly of the fixed cutters or knives 138 and 154 for completing the halving of the fruit carried by the carriers and for ejecting the pits from the fruit. The means 150 includes a pair of levers 170 and 172 pivotally mounted at their lower ends to a pair of upstanding ears 174 and 176 on the side bar 14 and a similar pair of levers 178 and 180 pivotally affixed at their lower terminals to upstanding ears 182 on the side bar 12. The pairs of bars are disposed in alignment and extend upwardly from the side bars, the levers 170 and 180 being connected by a transverse bar 184.

A pair of cross bars 186 and 188 join the upper terminals of the levers 180 and 170 and the levers 178 and 172. A U-shaped cradle or support 190 extend from the cross bars 186 and 188 by means of fasteners 192 secured to the lateral edge 194 and 196 on the support. A cutter and pitter 198 is carried by the central portion of the support or bracket 190 and includes a body portion 200 fastened to the support or cradle 190 and parallel straight legs or limbs 202 and 204 which terminate at their outer free ends in sharpened terminals 206 and 208. The cutter is movable vertically through a longitudinal opening 210 formed in the platform 84 and extends between guide plates 212.

A shaft 214 is rotatably journaled in bearings 216 and 218 on the underside of the side bars 14 and 16 and is provided at its opposing ends with cranks 220 and 222. A connecting lever 224 is pivotally secured between the lever 178 and the crank 220. A similar connecting lever 226 is pivoted between the crank 220 and the lever 172. A pitman rod 228 is formed with sleeve ends, one of the ends being disposed on a wrist pin 230 extending from the crank 220 and the opposing end being mounted on a wrist pin 232, which extends from an arm 234 carried by the drive shaft 48.

Thus, as the chains are moved to advance the carrier through the fixed knives 138 and 154, the supporting levers 170, 172, and 178, 180 for the cutter and pitter 198 are swung downwardly through the actuating means, consisting of the pitman rod, the crank, so that the cutter is moved vertically through the opening 210 in the platform. As seen in Figure 4, the machine is timed so that the cutter moves downwardly through the opening 210 at the same time that a carrier is positioned over the opening.

Means is provided for moving and retaining the chains inwardly, adjacent to the slot 210 and includes a pair of arms 236 and 238 formed at their upper ends with transversely disposed flat runners or bars 240 and 242. The arms 236 and 238 extend vertically through openings 242 in the side bars. A similar pair of arms 244 and 246 are provided and are connected to the bars 240 and 242.

The bars 238 and 244 are pivoted adjacent to their lower ends on pins 248 and the opposing set of bars are similarly pivoted on pivot pins 250. Rods 252 and 254 are secured transversely between the lower ends of the sets of bars and springs 256 and 258 are anchored at one end of the rods. The opposing ends of the springs are anchored to a depending flange 260 on the outer end of a laterally extending bracket 262. The springs urge the sets of bars inwardly upon their pivots 248 and 250 and urge the bars 240 and 242 into engagement with the chains to hold them inwardly, as the carriers move past the vertically reciprocating cutter 198.

A U-shaped stop or guard G projects upwardly from the side bars and in advance of the cutter and pitter 198, the stop being provided to prevent the cutter assembly from swinging forwardly, at any time, and possibly injuring the operator.

It can thus be seen that a practical, economical and compact device has been provided, whereby fruit may be halved and pitted in a manner so as not to shred or tear the fruit and in a completely automatic operation.

Having described the invention, what is claimed as new is:

In a machine for cutting and pitting peaches and similar fruit, a frame, a pair of parallel rotary chains mounted on the frame, sectional fruit carriers carried by the chains and including cooperating sections on each chain, a pair of vertically spaced and aligned fixed knives mounted on the frame and positioned between the chains and parallel therewith, said knives being positioned to intersect the sections of each carrier and form incisions in the upper and lower portions of the fruit held therein, a reciprocable U-shaped cutter mounted on the frame behind the knives to cut the front and back of the fruit in alignment with the upper and lower incisions and thereby halve the fruit and force the pits downwardly therefrom, means connected to the drive means for the chains for actuating the cutter, said last means including pivoted levers supporting the cutter and mounted on the frame, a crank pivoted on the frame and connected to the levers, and a pair of spring connected guide members swingably mounted on the frame and extending past the knives and toward the cutter, said guide members being arranged to engage and retain the cooperating sections toward each other as the cooperating sections are moved past the knives and toward the cutter.

LEONARD VANDERHOOFVEN.

REFERENCES CITED

The following references are of record in the file of this patent:

UNITED STATES PATENTS

| Number | Name | Date |
| --- | --- | --- |
| 466,453 | Burns | Jan. 5, 1892 |
| 1,261,704 | Clemson | Apr. 2, 1918 |
| 1,334,162 | Moltzner | Mar. 16, 1920 |
| 1,443,621 | Fowler | Jan. 30, 1923 |
| 1,526,635 | Groves | Feb. 17, 1924 |
| 2,403,516 | Gaddini | July 9, 1946 |
| 2,498,962 | Patterson | Feb. 28, 1950 |
| 2,514,120 | Chenette | July 4, 1950 |
| 2,556,266 | Furtado | June 12, 1951 |